(No Model.)

P. J. CLANCY.
PLUMBER'S TRAP.

No. 330,679. Patented Nov. 17, 1885.

WITNESSES
H. A. Decatur
N. J. Cambridge

INVENTOR
Patrick J. Clancy

UNITED STATES PATENT OFFICE.

PATRICK J. CLANCY, OF DANVERS, MASSACHUSETTS, ASSIGNOR TO HIMSELF AND JOHN J. KANAVAN, OF SAME PLACE.

PLUMBER'S TRAP.

SPECIFICATION forming part of Letters Patent No. 330,679, dated November 17, 1885.

Application filed May 22, 1885. Serial No. 166,394. (No model.)

*To all whom it may concern:*

Be it known that I, PATRICK J. CLANCY, a citizen of the United States, residing at Danvers, in the county of Essex and State of Massachusetts, have invented certain Improvements in Plumbers' Traps, of which the following is a full, clear, and exact description, reference being had to the accompanying drawings, making part of this specification, in which—

Figure 1:
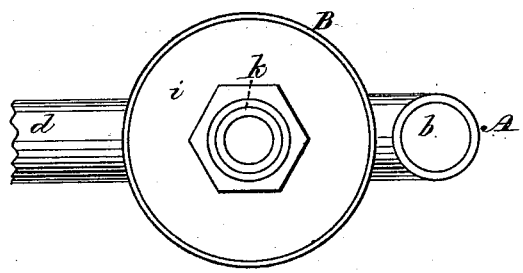
Figure 2:
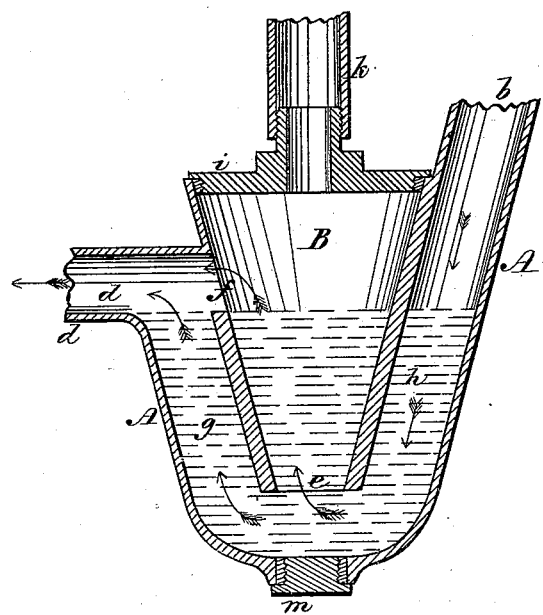

Figure 1 is a plan of a plumber's trap constructed in accordance with my invention. Fig. 2 is a longitudinal vertical section through the center of the same.

My invention has for its object to provide a simple and effective plumber's trap which will be entirely free from liability to become emptied by the siphonage of the water through the discharge-pipe, and which will not become clogged or obstructed by deposits of sediment or filth; and my invention consists in a novel combination and arrangement of parts, as hereinafter set forth and specifically claimed.

In the said drawings, A represents a pipe of U form, having an inlet, $b$, to which is connected the pipe leading into the house or sink or to the bowl or other fixture, and an overflow or discharge-pipe, $d$, leading to the drain or sewer.

Between the ascending and descending portions of the U-shaped pipe A is secured a casing or receptacle, B, preferably of conical or tapering form, and having at its smaller end an opening or passage, $e$, communicating with the pipe A at the lower portion or bend.

In the side of the receptacle or chamber B is an outlet opening or passage, $f$, communicating with the pipe A at a point on a level with the upper end of the discharge-pipe $d$, a double outlet being thus formed for the water which passes to the discharge-pipe $d$, either through the ascending leg or portion $g$ of the pipe A or up through the opening $e$ into the chamber B, and thence out through the opening $f$. The dip or seal is formed by the water which lies within the bent portion of the pipe A and in the receptacle B, as seen in Fig. 2.

With the construction and arrangement of parts whereby a double outlet to the overflow or discharge pipe $d$ is formed, as above described, it will be impossible for the trap to become emptied by the siphonage of the water through the discharge-pipe, for the reason that the air will pass through the opening $f$ to the overflow-pipe, and thus prevent the formation of a vacuum, thus insuring the trap being left at all times in a perfect condition to intercept the passage of noxious gases and vapors from the sewer into the house.

I prefer to make the receptacle or casing B of conical form with the smaller end at the bottom, as shown, for the reason that the upward passage of the water entering at the opening $e$ will serve to stir up and wash out any sediment or accumulation of filth that may be deposited at the bottom of the pipe A, and cause it to be carried out of the opening $f$ to the outlet $d$, while the pipe A will be kept free and clear by the direct passage of the water through it; hence my improved trap will not be liable to become obstructed by the collection or lodgment therein of filth or refuse matter.

The upper end of the casing B is provided with a removable screw-plug or cap, $i$, and the under side of the bend of the pipe A is also furnished with a screw-plug, $m$, to facilitate the cleaning of the trap in case it should be required; but this latter plug $m$ may be dispensed with, if desired.

What I claim as my invention, and desire to secure by Letters Patent, is—

In a trap, the combination, with the U-shaped pipe A, having the inlet $b$ and discharge-pipe $d$, of the casing or receptacle B, made of conical or tapering form and arranged within the bend of the pipe A with its smaller end downward and communicating with the said pipe at the bottom of its bend through a passage or opening, $e$, and having the passage or opening $f$ on the side next to the discharge-pipe $d$ and on a level with the upper end of the same, all constructed to operate substantially as and for the purpose described.

Witness my hand this 14th day of May, A. D. 1885.

PATRICK J. CLANCY.

In presence of—
P. E. TESCHEMACHER,
W. J. CAMBRIDGE.